United States Patent
Willard et al.

(10) Patent No.: US 6,738,972 B1
(45) Date of Patent: May 18, 2004

(54) METHOD FOR FLOW SCHEDULING

(75) Inventors: Pierre Willard, Palo Alto, CA (US); Jerome Rousseau, Paris (FR)

(73) Assignee: OpenTV, Inc., San Francisco, CA (US)

( * ) Notice: Subject to any disclaimer, the term of this patent is extended or adjusted under 35 U.S.C. 154(b) by 0 days.

(21) Appl. No.: 09/476,722

(22) Filed: Dec. 30, 1999

(51) Int. Cl.[7] ............................................. G06F 9/00
(52) U.S. Cl. ..................... 718/103; 718/102; 725/97; 725/93; 725/96; 725/101; 725/116
(58) Field of Search .................... 370/395.4, 395.42; 725/97, 93, 96, 101, 116; 709/103, 102; 718/102, 103; G06F 9/00

(56) References Cited

U.S. PATENT DOCUMENTS

| | | | |
|---|---|---|---|
| 5,168,356 A | | 12/1992 | Acampora et al. |
| 5,210,872 A | * | 5/1993 | Ferguson et al. ............ 709/102 |
| 5,394,548 A | * | 2/1995 | Nakajima et al. ........... 709/103 |
| 5,473,773 A | * | 12/1995 | Aman et al. ................. 709/104 |
| 5,592,626 A | * | 1/1997 | Papadimitriou et al. .... 709/102 |
| 5,606,695 A | * | 2/1997 | Dworzecki ..................... 705/8 |
| 5,675,739 A | * | 10/1997 | Eilert et al. ................. 709/226 |
| 5,701,582 A | * | 12/1997 | DeBey ......................... 725/103 |
| 5,712,976 A | | 1/1998 | Falcon, Jr. et al. |
| 5,787,482 A | * | 7/1998 | Chen et al. .................. 711/158 |
| 5,832,208 A | * | 11/1998 | Chen et al. .................. 713/201 |
| 5,832,262 A | * | 11/1998 | Johnson et al. ............. 709/102 |
| 5,845,116 A | * | 12/1998 | Saito et al. .................. 709/103 |
| 5,913,039 A | | 6/1999 | Nakamura et al. |
| 5,951,646 A | | 9/1999 | Brandon |
| 5,951,698 A | * | 9/1999 | Chen et al. .................... 714/38 |
| 6,349,321 B1 | * | 2/2002 | Katayama ................... 709/103 |
| 6,374,405 B1 | * | 4/2002 | Willard ......................... 725/94 |
| 6,378,052 B1 | * | 4/2002 | Genduso et al. ............ 711/158 |
| 6,490,612 B1 | * | 12/2002 | Jones et al. ................. 709/107 |
| 6,571,391 B1 | * | 5/2003 | Acharya et al. .............. 725/87 |

FOREIGN PATENT DOCUMENTS

| EP | 0 690 400 A3 | 6/1995 |
|---|---|---|
| EP | 0 690 400 A2 | 6/1995 |

* cited by examiner

*Primary Examiner*—Vivek Srivastava
*Assistant Examiner*—Jason Chung
(74) *Attorney, Agent, or Firm*—Meyertons Hood Kivlin Kowert & Goetzel, P.C.; Rory D. Rankin (57) ABSTRACT

A system and method implemented in an interactive television system for scheduling delivery of modules of interactive television applications from a broadcast station to a receiving station. In one embodiment, a list of modules and corresponding start times, end times and durations is provided. Minimum beginning times and maximum beginning times are determined for each of the modules. The modules in the list are prioritized, first according to minimum beginning times and then according to maximum beginning times. A module having the earliest maximum beginning time is selected from those modules for which the minimum beginning time is equal or prior to a current time. A portion of the selected module is scheduled. After a portion of a module is scheduled, the information in the module list is updated, the modules in the list are re-prioritized, and another module is selected for scheduling. This is repeated until all of the modules have been scheduled.

17 Claims, 4 Drawing Sheets

METHOD FOR FLOW SCHEDULING

BACKGROUND OF THE INVENTION

1. Field of the Invention

The invention relates generally to scheduling methods and more particularly to methods for scheduling a flow of information by selecting and scheduling portions of modules having the highest priorities.

2. Description of the Related Art

Interactive television systems are capable of providing a wide variety of services to viewers. These services may include delivery of television programming, interactive applications and the like. Interactive television systems are also capable of registering viewer responses to the audio and video information presented by the system. Interactive television systems may therefore be useful for a number of marketing, entertainment and educational purposes.

In an interactive television system, a broadcast service provider generates an interactive television signal for transmission to a viewer's television. The interactive television signal may include an interactive portion consisting of application code or control information, as well as an audio-video portion consisting of a television program. The broadcast service provider combines the audio-video and interactive portions into a single signal for transmission to a receiver connected to the user's television. The signal is generally compressed prior to transmission and is transmitted through typical broadcast channels, such as cable television (CATV) lines or direct satellite transmission systems.

The signal transmitted by the broadcast service provider is typically received by a set-top box coupled to a viewer's television. The set-top box separates the interactive portion from the audio-video portion and decompresses the respective portions of the signal. The set-top box may then execute received applications and pass received audio-video information to the television. The set-top box may also combine the audio-video information with interactive graphics or audio generated by the interactive application prior to transmitting the information to the television. The interactive graphics and audio may present additional information to the viewer, or may prompt the viewer for input. The set-top box may provide viewer input or other information to the broadcast service provider via a modem connection or another return path.

The interactive applications, television programming and other information transmitted by the interactive television system may consist of one or more information modules. These modules are normally formatted into packets, each of which contains a portion of the modules' information. The packets are transmitted to the set-top box, where they are reconstructed into the modules. The packets of a module may be transmitted consecutively, or they may be interspersed with packets containing portions of other modules.

The simple way of scheduling transmission of a module is to calculate (approximately) the time required to deliver the entire module and then subtract this from the scheduled delivery time. The duration of the transmission can be determined by dividing the size of the module by the bit rate at which its packets will be transmitted. This method for scheduling a module requires that the broadcast channel be reserved for this particular module and that all of the module's packets be transmitted consecutively. This may present considerable difficulty in scheduling the potentially large number of modules which may need to be transmitted by the system. An improved mechanism for scheduling delivery of the modules would therefore be desirable.

SUMMARY OF THE INVENTION

Broadly speaking, the invention comprises a system and method for scheduling the delivery of information modules. A scheduling algorithm is employed to prioritize the modules and to select a module with the highest priority to be scheduled. The priority of each module is based on corresponding scheduling information. Because this scheduling information may change as the modules or portions thereof are scheduled, the information must periodically be updated and the priorities of the modules recalculated. When a module is selected for scheduling, the amount of time which can elapse before recalculation is necessary is determined and only a corresponding portion of the selected module is scheduled. After the module information is updated to reflect the scheduling of the module and the resulting priorities are recalculated, a new module is selected for further scheduling.

One embodiment comprises a method for scheduling the flow of modules in an information transmission system. A list of modules to be transmitted is compiled. The list contains a minimum beginning time, a maximum beginning time and a remaining duration for each of the modules. The list is examined and any minimum beginning time which is prior to a current time is set to the current time. The list is then ordered, the first according to the minimum beginning times of the modules, and then according to the maximum beginning times of the modules. A module which is available for transmission (i.e., one which has a minimum beginning time prior to, or equal to, the current time) and which has the earliest maximum beginning time is then selected from the top of the list. The maximum portion of the selected module which can be transmitted before the order of the list must be recalculated is then scheduled. The current time is advanced by an amount equivalent to the scheduled portion of the module and the information corresponding to each of the modules is recalculated, if necessary (i.e., the length of the scheduled portion is subtracted from the maximum beginning time and duration of the scheduled module, and the minimum beginning time of each module is updated to the current time.) The list is then reordered according to the updated information for the modules and the steps above are repeated.

One embodiment comprises a computer readable storage medium which embodies the foregoing method. The storage medium may comprise floppy disks, magnetic tapes, optical disks, RAM, ROM, flash memory, etc. The storage media and has program instructions recorded therein for controlling the operation of a computer system. The program instructions are executable by the computer system to direct the computer system to examine the module information, order the modules, select the highest priority module, schedule at least portion of this module and recalculate the module information. These steps are repeated until the modules are completely scheduled.

One embodiment comprises a scheduler in an interactive television system for constructing a flow of modules. The scheduler is implemented in a broadcast station and is configured to determine the size and order in which portions of the modules will be broadcast to subscribers. The scheduler is configured to examine scheduling information for each module and to prioritize the modules according to this information. The information includes a minimum beginning time, a maximum beginning time and a duration for each module. The scheduler examines the minimum beginning times and, for each one which is prior to the current time, sets that one equal to the current time. The scheduler then lists the modules, in ascending order, according to their minimum beginning times. Modules which have the same minimum beginning time are ordered according to increasing maximum beginning times. The first module in the list is then selected to be scheduled. The scheduler determines how much of the module can be transmitted before the order of the modules (i.e., their priorities) must be recalculated. The scheduler schedules a corresponding portion of the module for transmission. The information for the modules is then updated, the priorities of the modules are recalculated and the next module (or portion thereof) is selected to be scheduled.

It should be noted that many additional embodiments of the present system and method will be apparent to persons of ordinary skill in the art of the invention. The embodiments disclosed herein are intended to be illustrative rather than limiting, and it is contemplated that modifications and variations of the disclosed embodiments are within the spirit and scope of this disclosure.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

One embodiment of the invention is described below. This embodiment comprises a method for scheduling a group of modules where only a single module can be scheduled at one time. The method consists primarily of the steps of: prioritizing the modules; selecting the module with the highest priority; scheduling at least a portion of this module; and repeating these steps. The following description focuses on an implementation of the method in an interactive television system.

The prioritization of the modules is based on a minimum beginning time and a maximum beginning time for each of the modules. Modules having a minimum beginning time which is prior or equal to a current time are available to be scheduled. These modules are selected (with equal priority based on their respective minimum beginning times) by setting the minimum beginning time for each of them to the current time, and arranging the modules in order of increasing minimum beginning time. Modules having the same minimum beginning time are arranged in order of increasing maximum beginning times. Thus, the first module in the list of modules will be the one of the available modules that has the earliest maximum beginning time.

At least a portion of the selected module is scheduled. Scheduling this portion of the selected module affects the information in the list of modules. In regard to the selected module, the remaining duration decreases and the maximum beginning time increases. In regard to the other modules on the list, the current time is advanced and, if the minimum beginning time of a module is prior to the new current time, it will be updated to the current time. Because the information in the list has changed, the priorities of the modules may also have changed. The list may therefore need to be reordered. As will be explained in more detail below, the portion of the module which is scheduled is determined based upon the information corresponding to the non-selected modules in the list. Generally speaking, the size of the portion is calculated to be just large enough to require the module list to be re-ordered.

As indicated above, when a portion of the selected module is scheduled, the remaining duration of that module decreases by the scheduled amount and the maximum beginning time for the module is increased by the scheduled amount. This information must therefore be updated after the portion of the module is scheduled. The current time is also increased by the scheduled amount. After this information is updated, the minimum beginning times of the available modules are again set to the current time and the modules are re-prioritized so that another module (or portion thereof) can be selected to be scheduled. These steps are repeated until the entirety of each module has been scheduled. (If one or more modules cannot be scheduled, an error notification is presented to the user.)

Figure 1:
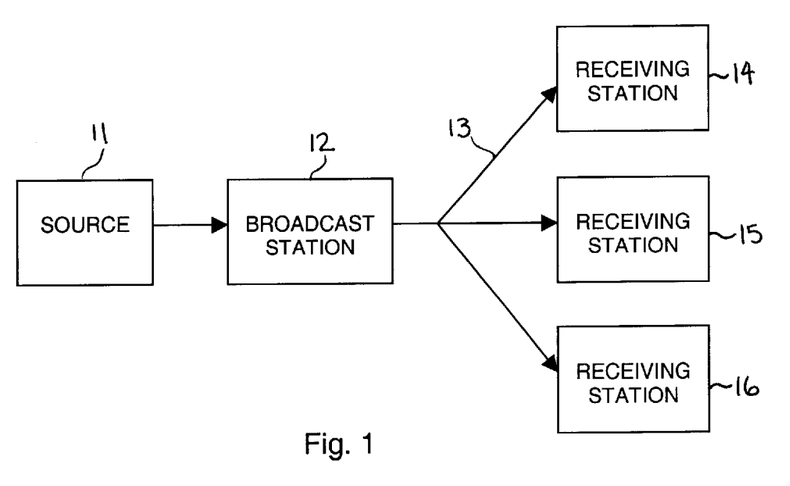
FIG. 1 is a block diagram illustrating an interactive television system in which one embodiment is employed.

In one embodiment, the method is implemented in an interactive television system. Referring to FIG. 1, a broadcast station 12 is coupled to one or more receiving stations 14–16 via broadcast network 13. Broadcast network 13 may consist of any suitable means for transmitting a broadcast signal, including satellite, cable, telco, MMDS (microwave) and terrestrial transmission media. The information to be transmitted from the broadcast station to the receiving stations is provided by data source 11. Source 11 may comprise one or more individual sources of data and may include devices such as video or data servers, application servers, live television feeds, and the like. Because the modules provided by data source 11 cannot all be transmitted over broadcast network 13 at once, is assumed to be limited, it is necessary to determine the order in which the information provided by the data source will be transmitted to the receiving stations.

Figure 2:
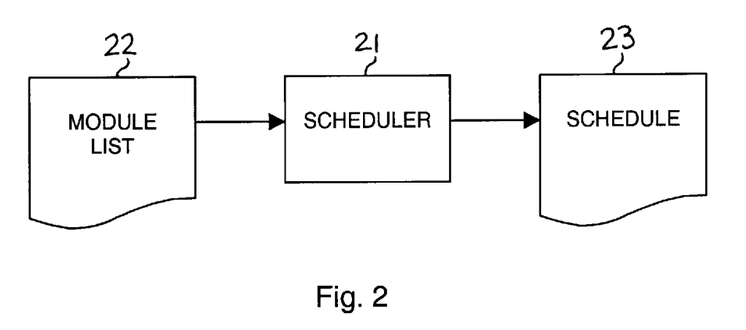
FIG. 2 is a diagram illustrating the flow of information in a scheduler in one embodiment.

Referring to FIG. 2, the function of the present method is illustrated. As set forth above, information provided by a data source must be scheduled for transmission. In this embodiment, the information is provided in the form of a plurality of modules. A scheduler 21 accepts as input a list 22 of these modules. Each entry in the list identifies several scheduling constraints associated with each module. Scheduler 21 prioritizes the modules on the list and selects modules to be scheduled based on the information for each module in the list. Scheduler 21 produces as output a schedule 23. Schedule 23 identifies the order in which the modules, or portions of the modules, should be transmitted to meet the associated scheduling constraints.

Figure 3:
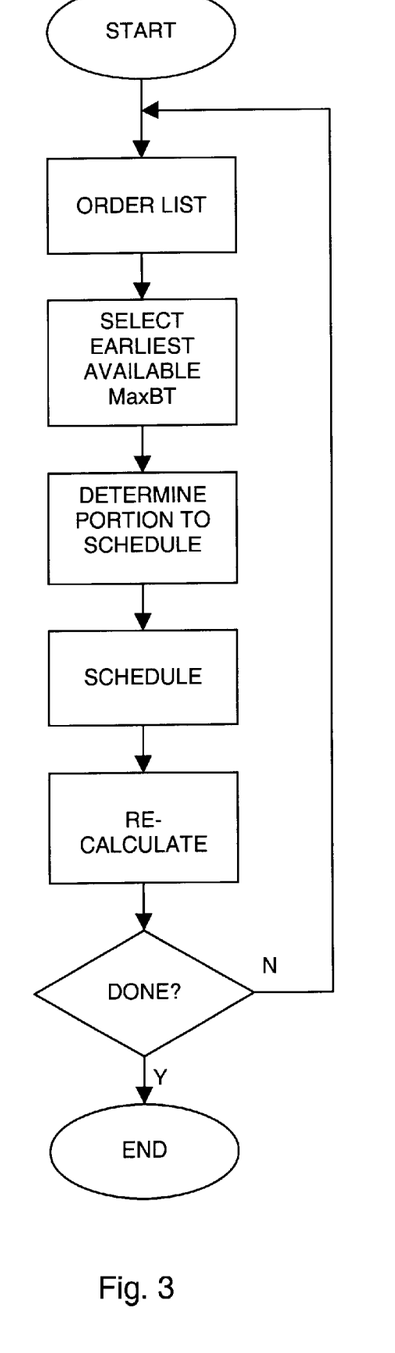
FIG. 3 is a flow diagram illustrating the method of one embodiment.

Referring to FIG. 3, a flow diagram illustrating the method in one embodiment is shown. In this embodiment, the method generally comprises the steps of: ordering a list of modules according to associated scheduling information; selecting an available module with the earliest maximum beginning time; determining a portion of the selected module to be scheduled; scheduling the portion of the module; re-calculating the scheduling information for the modules in the list; and repeating these steps until all of the modules have been scheduled.

As indicated above, each module has certain scheduling information associated with it. This information defines the constraints within which each module must be scheduled. In this embodiment, each module initially has a corresponding start time, end time and duration. The start time and end time define a temporal window within which the module must be transmitted. In other words, transmission of the module must begin no sooner than the start time, and must be completed no later than the end time.

The initial duration of the module is determined by the size of the module and the bit rate of the transmission. If the initial duration is greater than the difference between the start time and the end time, the module cannot be scheduled within the given constraints. In such a case, the user is notified that the scheduling constraints for this module cannot be met, and the module is removed from further consideration (i.e., there is no attempt to schedule module.) (It should be noted that the user may be a person, a client application or some other entity which requires notice of scheduling errors. If the initial duration of the module is equal to the difference between the start time and the end time, transmission of the module must be scheduled to begin at the start time and continue until the module has been completely transmitted in order to fall within the allowed window. If the initial duration of the module is less than the difference between the start time and the end time, it is possible to schedule the module, and possibly other modules, within the allowed window.

Figure 4:
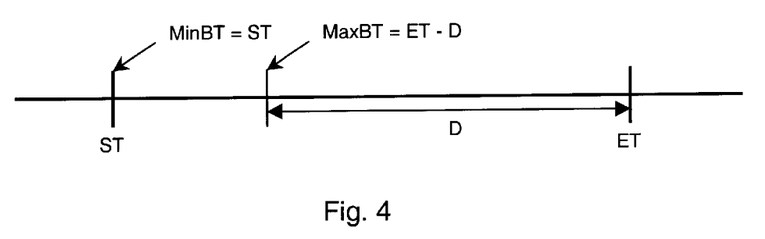
FIG. 4 is a diagram illustrating the relation between the minimum and maximum beginning times for a module and the starting time, end time and duration of the module.

In one embodiment, the information maintained in the list of modules includes a minimum beginning time (MinBT) and a maximum beginning time (MaxBT). The minimum beginning time is initially set to the start time (ST). The maximum beginning time is initially set to the end time (ET) minus the duration (D):

MinBT=ST

MaxBT=ET−D

This is illustrated in FIG. 4.

Generally speaking, the list of modules is ordered by the minimum beginning times and the maximum beginning times of the respective modules. Before the list is ordered, however, the minimum beginning times are compared to the current time and any which are prior to the current time are reset to the current time. By doing so, the modules which are available for scheduling (i.e., those for which the minimum beginning time has been reached) are prioritized only by their maximum beginning times. (As explained further elsewhere in this disclosure, the minimum and maximum beginning times are re-calculated and the list is re-ordered whenever a portion of a module is scheduled.)

Because the modules are ordered by the minimum beginning time and then by the maximum beginning time, the first module in the re-ordered list is the one of the available modules which has the earliest maximum beginning time. (If two available modules have the same maximum beginning time, they may be further ordered according to additional criteria such as predetermined priority ratings, or one of the modules may simply be selected at random.) At least a portion of this first module is scheduled. If the scheduled portion of the module has a duration P, the maximum beginning time of the scheduled module must be adjusted by this amount because the remainder of the module has a shorter duration than the initial duration D and consequently requires less time to be transmitted before the end time.

Because the maximum beginning time of the module is adjusted by P, the ordering of the list of modules may no longer be valid. If the portion of the module is smaller than the optimal size, re-calculation and re-ordering of the list will be performed when it is not necessary. If the portion of the module is larger than the optimal size, a module with a higher priority may be left unscheduled and, consequently, its scheduling constraints may not be met. The portion of the module to be scheduled (and the corresponding value of P) is therefore chosen to be just large enough that the list must be re-ordered (unless the remainder of the module is less than this amount, in which case the remainder of the module is scheduled and the next module on the list is selected to be scheduled.)

Thus, in order to properly schedule the portion of the selected module, the amount of the module that should be scheduled (i.e., the duration P) must be determined. In one embodiment, the amount of time available for scheduling a portion of the selected module is determined by subtracting the current time from the smallest maximum beginning time of the modules (including those which are not yet available.) The value of P is calculated in this manner because, until a module's maximum beginning time has been reached, that module can wait to be scheduled. Once the maximum beginning time has been reached, the entirety of the module must be scheduled.

In another embodiment, the duration available for scheduling is determined by the need to re-calculate and possibly re-order the list of modules. Re-calculation and re-ordering will be necessary if either of two conditions is met: a new module becomes available (i.e., its minimum beginning time is prior or equal to the new current time); or the maximum beginning time of another available module becomes prior or equal to the maximum beginning time of the selected module. The portion of the selected module is therefore chosen so that P is the smaller of: the difference between the current time (prior to scheduling the portion) and the earliest minimum beginning time among the modules which are unavailable; and the difference between the maximum beginning time of the selected module and the earliest maximum beginning time among the modules which are available.

In yet another embodiment, P may be chosen to be the lesser of: the difference between the current time and the earliest minimum beginning time among the modules which are unavailable; and the difference between the maximum beginning times of the selected module next available module on the list, plus 1. This additional unit of the selected module (which may be a packet or some other minimum scheduling unit) is scheduled so that, after the module information is updated, the first two modules on the list will not have identical minimum and maximum beginning times. Thus, if the selected module and the next highest priority module have the same minimum and maximum beginning times, preference is given to the already-selected module. If, by some circumstance, two available modules at the top of the list have the same maximum beginning time, the portion to be scheduled may be chosen so that P has at least a predetermined minimum duration (e.g., 1.)

Once the amount of the selected portion of the module has been determined, it can be scheduled. When this portion of the module is scheduled, the information for the modules is updated. As set forth above, the maximum beginning time of the selected module is advanced by P. If all of the selected module has been scheduled, this module is removed from the list. The current time (CT) is advanced to the ending time of the scheduled portion (i.e.,CT=CT+P). The minimum beginning times of the available modules are updated so that their minimum beginning times are equal to the current time. Any previously unavailable modules for which the minimum beginning time is prior or equal to the new current time are also updated in this manner (i.e., MinBT=CT). The list is then re-ordered and a new module is selected to be scheduled. (It should be noted that the "new" module is not necessarily different from the previously selected in module—after recalculation and re-ordering, the same module may still be first on the list.) These steps are repeated until all of the modules have been completely scheduled.

In one embodiment, this method may be implemented as a pre-scheduling mechanism. In other words, prior to beginning transmission, the information for all of the modules can be compiled and provided as an input to a scheduler which employs the method. The scheduler can then generate a schedule for transmission of the modules. This schedule can then be used to control the order and amounts of the modules' transmission. This implementation allows a user to identify any scheduling problems which may arise (e.g., the duration of a module exceeding the difference between its start time end time) and to remedy the problem (e.g., by modifying the scheduling constraints for one or more of the modules.) It should be noted that, particularly in embodiments which pre-schedule the modules, the "current" time generally is not the time at which a calculation is made, but is instead a time corresponding to the end of those modules (or portions thereof) which have already been scheduled.

In an alternate embodiment, the method may be implemented as a real-time scheduling mechanism. For example, a scheduler in the broadcast station of an interactive television system could be configured to accept requests for modules, identify any scheduling restraints and schedule the modules, even as other modules are being transmitted. The scheduler could be configured to add newly requested modules to the list as they are requested and recalculate/re-order the list, or the recalculation and re-ordering could be performed at times determined by the information previously contained in the list. Both the real-time and pre-scheduling embodiments could be easily implemented as software applications.

The operation of the method can be illustrated by the following simple example. Assume that three modules are required to be scheduled. The first has a start time (ST) of 0, an end time (ET) of 14 and a duration (D) of 4. (In this example, the times and durations will be unitless for the sake of simplicity.) The second module has a start time of 5, an end time of 17 and a duration of 10, and the third has a start time of 2, an end time of 16 and a duration of 3. The minimum beginning times of the modules are initially equal to their respective start times. Their maximum beginning times are equal to their end times minus their respective durations (i.e., 10 for the first module, 7 for the second module and 13 for the third module.) The module list therefore initially (i.e., at current time CT=0) contains the following information:

| CT = 0   | MinBT | MaxBT | remaining duration |
|----------|-------|-------|--------------------|
| Module 1 | 0     | 10    | 4                  |
| Module 3 | 2     | 13    | 3                  |
| Module 2 | 5     | 7     | 10                 |

Figure 5:
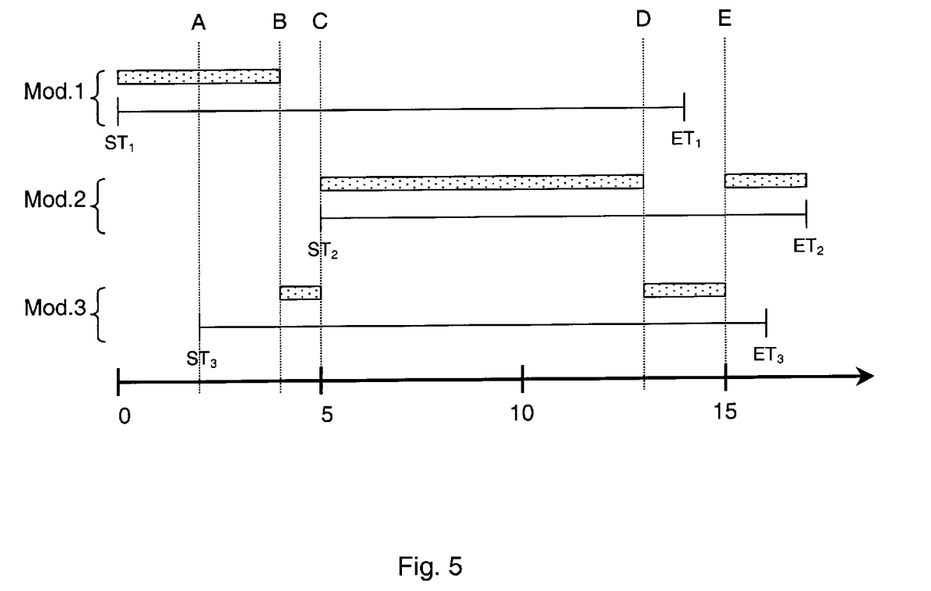
FIG. 5 is a timeline corresponding to an example illustrating the method of one embodiment.

In reviewing the example, it may be helpful to refer to FIG. 5, which depicts a timeline corresponding to the scheduling of the modules. Each of the following tables shows the module list at a particular point (A–E) on the timeline corresponding to the current time identified in the table.

At time CT=0, only one module (Module 1) has a minimum beginning time prior or equal to the current time. Therefore, Module 1 is selected to be scheduled. A portion of Module 1 having a duration of 2 can be scheduled because no other modules will be available until that time. After this portion of Module 1 is scheduled, the information for the module must be updated. More specifically, the maximum beginning time is increased by the duration of the scheduled portion (MaxBt=MaxBT+P) and the remaining duration is decreased by the same amount (D=D−P.) The current time is also updated by adding P. The list is then re-ordered by the minimum and maximum beginning times so that, at CT=2, it looks like this:

| CT = 2 (point A) | MinBT | MaxBT | remaining duration |
|------------------|-------|-------|--------------------|
| Module 1         | 2     | 12    | 2                  |
| Module 3         | 2     | 13    | 3                  |
| Module 2         | 5     | 7     | 10                 |

Since module 1 is still the first module in the list, it is again selected to be scheduled. This time, however, the duration of the scheduled portion is determined by taking the lesser of the difference between the current time and the earliest minimum beginning time among the modules which are unavailable (i.e., 3); and the difference between the maximum beginning time of the selected module and the earliest maximum beginning time among the modules which are available (i.e., 5.) Although it is possible to schedule up to 3 units of Module 1, this module only has a remaining duration of 2. The entire remaining portion is therefore scheduled and removed from the list. After the current time is updated (CT=CT+2=4,) the module information is updated and the list is re-ordered:

| CT = 4 (point B) | MinBT | MaxBT | remaining duration |
|------------------|-------|-------|--------------------|
| Module 1         | —     | —     | —                  |
| Module 3         | 4     | 13    | 3                  |
| Module 2         | 5     | 7     | 10                 |

Because another module (Module 2) will become available in 1 time unit, a portion of Module 3 having a duration of 1 is scheduled. After the module list is updated and re-ordered, it looks like this:

| CT = 5 (point C) | MinBT | MaxBT | remaining duration |
|---|---|---|---|
| Module 1 | — | — | — |
| Module 2 | 5 | 7 | 10 |
| Module 3 | 5 | 14 | 2 |

Because module 2 has a prior maximum beginning time, it has priority over module 3. Because there are no additional modules which may become available, the allowable duration of the scheduled portion of module 2 is determined primarily by the difference between the maximum beginning times of this module and the next closest module (i.e., 14−7=7.) Because scheduling a portion of Module 2 having a duration of 7 would cause the minimum and maximum beginning times of Modules 2 and 3 to be identical, the scheduled portion is chosen to have a duration of 8. After this portion of Module 2 is scheduled, the updated and re-ordered list is as follows:

| CT = 13 (point D) | MinBT | MaxBT | remaining duration |
|---|---|---|---|
| Module 1 | — | — | — |
| Module 3 | 13 | 14 | 2 |
| Module 2 | 13 | 15 | 2 |

Module 3 now has priority over Module 2 and is selected to be scheduled. P is chosen to be 2(for the same reasons set forth in the preceding paragraph.) Since the remaining duration of Module 3 is 2, the entire remainder of the module can be scheduled and the module can be removed from the list, as shown:

| CT = 15 (point E) | MinBT | MaxBT | remaining duration |
|---|---|---|---|
| Module 1 | — | — | — |
| Module 3 | — | — | — |
| Module 2 | 15 | 15 | 2 |

Module 2, which is the only module remaining on the list, is now scheduled. Since the maximum beginning time has not been exceeded, the remainder of the module can successfully be scheduled within its allowed window.

The result of the steps described in the preceding paragraphs is the following schedule:

| time | module | amount scheduled |
|---|---|---|
| 0 | 1 | 2 |
| 2 | 1 | 2 |
| 4 | 3 | 1 |
| 5 | 2 | 8 |
| 13 | 3 | 2 |
| 15 | 2 | 2 |

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A method for scheduling the flow of modules in an information transmission system, wherein said method comprises:

a processor examining a list of module entries stored in a memory, each said module entry having a minimum beginning time, a maximum beginning time and a remaining duration; and for each said module entry, said processor:

setting said minimum beginning time to a current time if said minimum beginning time is prior to said current time;

ordering said list of module entries by earliest minimum beginning time and, within module entries having identical minimum beginning times, ordering by earliest maximum beginning time;

selecting a first entry in said list of module entries;

scheduling a portion of said first entry to be scheduled, wherein scheduling said portion comprises determining a time period by taking the smaller of: the difference between said current time and an earliest minimum beginning time of ones of said module entries having minimum beginning times later than said current time; and the difference between said maximum beginning time of said first module entry and the earliest maximum beginning time of ones of said module entries having minimum beginning times less than or equal to said current time;

subtracting said portion from said remaining duration of said first entry;

adding said portion to said maximum beginning time of said first entry; and adding said portion to said current time.

2. The method of claim 1 wherein scheduling a portion of said first entry to be scheduled comprises determining a time period by subtracting an earliest maximum beginning time of said plurality of module entries from said current time and scheduling a maximum portion of said first entry which can be transmitted in said time period.

3. A method for scheduling the flow of modules in an information transmission system, said method comprising:

providing in a memory a plurality of module entries, wherein each said module entry includes a minimum beginning time and a maximum beginning time; and a processor:

selecting one of said plurality of module entries from a first group of said plurality of module entries, wherein said minimum beginning time of said one of said plurality of module entries in said first group is less than or equip to a current time, and wherein said maximum beginning time of said selected one of said plurality of module entries is no more than said maximum beginning time of the remainder of said module entries in said first group; and scheduling at least a portion of a module corresponding to said selected one of said plurality of module entries; and calculating said portion of said module by taking the smaller of: the difference between a current time and an earliest minimum beginning time of ones of said plurality of module entries having minimum beginning times later than said current time; and the difference between said maximum beginning time of said selected module entry and the earliest maximum beginning time of ones of said plurality of module entries having minimum beginning times earlier than or equal to said current time.

4. The method of claim 3 further comprising recalculating said maximum beginning time of said selected one of said plurality of module entries and repeating said selecting.

5. The method of claim 3 wherein said selecting comprises: if any of said plurality of module entries has a minimum beginning time less than a current time, setting said minimum beginning time to said current time; providing a list of said plurality of module entries; ordering skid list, first according to said minimum beginning time, and second according to said maximum beginning time; and selecting the first of said plurality of module entries in said list.

6. The method of claim 3 wherein said minimum beginning time for each module entry is initially set to a start time identified for said each module entry.

7. The method of claim 3 further comprising transmitting said portion of said selected one of said plurality of nodule entries.

8. The method of claim 3 presenting an indication of an error if, for any of said plurality of module entries, a duration of said any module entry is greater than an end time of said any module entry minus said current time.

9. The method of claim 3 further comprising calculating said portion of said module by subtracting an earliest maximum beginning time of said plurality of module entries from a current time.

10. The method of claim 3, further comprising presenting an indication of an error if, for any of said plurality of module entries, a duration of said any module entry is greater than an end time of said any module entry minus said current time.

11. The method of claim 3, further comprising calculating said portion of said module by subtracting an earliest maximum beginning time of said plurality of module entries from a current time.

12. The method of claim 3 wherein said maximum beginning time for each module entry is initially determined by subtracting a duration of said each module entry from an end time for said each module entry.

13. A scheduler comprising:

a processor; and a first memory coupled to said processor and configured to store a plurality of module entries, each said module entry having a corresponding minimum beginning time, a maximum beginning time, an ending time and a duration;

wherein said processor is configured to examine said module entries, to select a first one of said module entries and to schedule said first one of said module entries, wherein said first one of said module entries has a highest priority, wherein said highest priority indicates that said first one of said module entries has said minimum beginning time less than or equal to a current time and has an earliest maximum beginning time among said module entries having said minimum beginning time prior or equal to said current time;

wherein said processor is further configured to determine a portion of a module corresponding to said selected module entry such that, after scheduling of said portion of said module, a second one of said module entries has said highest priority.

14. The scheduler of claim 13 wherein said processor is configured to periodically re-order said module entries in said memory.

15. The scheduler of claim 14 wherein said processor is configured to re-order said module entries in said memory when scheduling of said first one of said module entries causes one or more priorities associated with said plurality of module entries to change.

16. The scheduler of claim 13 wherein said scheduler is configured to generate a schedule and to store said schedule in a second memory.

17. The scheduler of claim 13 wherein said scheduler is coupled to one or more module sources and is configured to select modules provided by said module sources to a broadcast transmitter.

* * * * *

UNITED STATES PATENT AND TRADEMARK OFFICE
CERTIFICATE OF CORRECTION

PATENT NO. : 6,738,972 B1
DATED : May 18, 2004
INVENTOR(S) : Willard et al.

It is certified that error appears in the above-identified patent and that said Letters Patent is hereby corrected as shown below:

Column 10,
Line 56, please replace "equip" with -- equal --.

Column 11,
Line 14, please replace "skid" with -- said --.
Line 23, please replace "nodule" with -- module --.

Signed and Sealed this

Thirty-first Day of August, 2004

JON W. DUDAS
*Director of the United States Patent and Trademark Office*